(12) United States Patent
Takahashi et al.

(10) Patent No.: US 12,127,033 B2
(45) Date of Patent: Oct. 22, 2024

(54) TERMINAL, BASE STATION AND COMMUNICATION METHOD

(71) Applicant: NTT DOCOMO, INC., Tokyo (JP)

(72) Inventors: Hideaki Takahashi, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 265 days.

(21) Appl. No.: 17/632,356

(22) PCT Filed: Aug. 8, 2019

(86) PCT No.: PCT/JP2019/031467
§ 371 (c)(1),
(2) Date: Feb. 2, 2022

(87) PCT Pub. No.: WO2021/024477
PCT Pub. Date: Nov. 2, 2021

(65) Prior Publication Data
US 2022/0295331 A1  Sep. 15, 2022

(51) Int. Cl.
*H04W 28/02* (2009.01)
*H04W 8/22* (2009.01)
*H04W 72/51* (2023.01)

(52) U.S. Cl.
CPC ......... *H04W 28/0215* (2013.01); *H04W 8/22* (2013.01); *H04W 72/51* (2023.01)

(58) Field of Classification Search
CPC ... H04W 28/0215; H04W 8/22; H04W 72/51; H04W 8/24; H04B 7/0456; H04B 7/0628
See application file for complete search history.

(56) References Cited

U.S. PATENT DOCUMENTS

| | | | | |
|---|---|---|---|---|
| 2013/0142125 A1* | 6/2013 | Shimezawa | ............ | H04B 7/046 370/328 |
| 2018/0123654 A1* | 5/2018 | Park | ..................... | H04B 7/0456 |
| 2018/0367202 A1* | 12/2018 | Yang | ..................... | H04B 7/0478 |
| 2019/0288751 A1* | 9/2019 | Jin | ............................. | G06T 7/73 |
| 2020/0053721 A1* | 2/2020 | Cheng | ................... | H04B 7/0408 |
| 2020/0358505 A1* | 11/2020 | Park | ....................... | H04B 7/088 |
| 2021/0226682 A1* | 7/2021 | Park | ....................... | H04L 5/005 |

(Continued)

OTHER PUBLICATIONS

3GPP TS 38.300 V15.5.0; "3rd Generation Partnership Project; Technical Specification Group Radio Access Network; NR; NR and NG-RAN Overall Description; Stage 2 (Release 15)"; Mar. 2019 (97 pages).

(Continued)

*Primary Examiner* — Ashley Shivers
(74) *Attorney, Agent, or Firm* — Osha Bergman Watanabe & Burton LLP

(57) ABSTRACT

A terminal includes a reception unit that receives, from a base station, a message for requesting to report a terminal capability, a control unit that configures information for reporting a parameter associated with a codebook based on information for indicating a range of the parameter associated with the codebook included in the message for requesting the report of the terminal capability, and that includes, in a message for reporting the terminal capability, the information for reporting the parameter associated with the codebook, and a transmission unit that transmits the message for reporting the terminal capability to the base station.

4 Claims, 11 Drawing Sheets

(56) References Cited

U.S. PATENT DOCUMENTS

2021/0360391 A1* 11/2021 Gao ..................... H04W 76/20
2022/0007176 A1* 1/2022 Lindheimer .......... H04W 24/04

OTHER PUBLICATIONS

3GPP TS 38.331 V15.5.1; "3rd Generation Partnership Project; Technical Specification Group Radio Access Network; NR; Radio Resource Control (RRC) protocol specification (Release 15)"; Apr. 2019 (491 pages).
3GPP TS 38.101-3 V15.5.0; "3rd Generation Partnership Project; Technical Specification Group Radio Access Network; NR; User Equipment (UE) radio transmission and reception; Part 3: Range 1 and Range 2 Interworking operation with other radios (Release 15)"; Mar. 2019 (224 pages).
International Search Report for corresponding International Application No. PCT/JP2019/031467, mailed Mar. 10, 2020 (3 pages).
Written Opinion for corresponding International Application No. PCT/JP2019/031467, mailed Mar. 10, 2020 (3 pages).
NTT Docomo, Inc .; "Capability filtering on CodebookParameters"; 3GPP TSG-RAN WG2 #107, R2-1911485; Prague, Czech Republic; Aug. 26-30, 2019 (2 pages).

* cited by examiner

FIG.5

2> if *codebookParameterFilterList* is received:
  3> if the codebook related parameters as defined in *CodebookParameters* are supported:
    4> for each supported frequency band indicated by *bandNR* in *CodebookParametersFilter*:
      5> if *totalNumberTxPortsPerBand* is included:
        6> include, into *CodebookParameters*, all of *SupportedCSI-RS-Resource* for which *totalNumberTxPortsPerBand* is less than the value indicated by *totalNumberTxPortsPerBand*;
      5> if *maxNumberTxPortsPerResource* is included:
        6> include, into *CodebookParameters*, all of *SupportedCSI-RS-Resource* for which *maxNumberTxPortsPerResource* is less than the value indicated by *maxNumberTxPortsPerResource*;
      5> if *maxNumberResourcesPerBand* is included:
        6> include, into *CodebookParameters*, all of *SupportedCSI-RS-Resource* for which *maxNumberResourcesPerBand* is less than the value indicated by *maxNumberResourcesPerBand*;
      5> if *maxNumberCSI-RS-ResourceList* is included:
        6> for each supported codebook type, include, into *supportedCSI-RS-Resourcelist*, *SupportedCSI-RS-Resource* up to the number indicated by *maxNumberCSI-RS-ResourceList*;
      5> if *requestedCodebookTypes* is included:
        6> if the codebook type indicated by *requestedCodebookTypes* is supported by the UE:
          7> include, into *CodebookParameters*, the codebook parameters supported for the indicated codebook
  3> set *codebookParametersRequested* to true in *RF-ParametersMRDC*;

FIG.6

```
RF-ParametersMRDC information element

-- ASN1START
-- TAG-RF-PARAMETERSMRDC-START

RF-ParametersMRDC ::=          SEQUENCE {
    supportedBandCombinationList    BandCombinationList         OPTIONAL,
    appliedFreqBandListFilter       FreqBandList                OPTIONAL,
    ...,
    [[
    srs-SwitchingTimeRequested      ENUMERATED {true}           OPTIONAL,
    supportedBandCombinationList-v1540  BandCombinationList-v1540   OPTIONAL
    ]],
    [[
    supportedBandCombinationList-v1550  BandCombinationList-v1550   OPTIONAL
    ]],
    [[
    supportedBandCombinationList-v1560      BandCombinationList-v1560   OPTIONAL,
    supportedBandCombinationListNEDC-Only   BandCombinationList         OPTIONAL
    ]],
    [[
    codebookParametersRequested     ENUMERATED {true}           OPTIONAL
    ]],
    ...
}

-- TAG-RF-PARAMETERSMRDC-STOP
-- ASN1STOP
```

FIG.7

*CodebookParameters information element*

```
-- ASN1START
-- TAG-CODEBOOKPARAMETERS-START

CodebookParameters ::=          SEQUENCE {
    type1                           SEQUENCE {
        singlePanel                     SEQUENCE {
            supportedCSI-RS-ResourceList    SEQUENCE (SIZE (1..maxNrofCSI-RS-
Resources)) OF SupportedCSI-RS-Resource,
            modes                           ENUMERATED {mode1, mode1andMode2},
            maxNumberCSI-RS-PerResourceSet  INTEGER (1..8)
        },
        multiPanel                      SEQUENCE {
            supportedCSI-RS-ResourceList    SEQUENCE (SIZE (1..maxNrofCSI-RS-
Resources)) OF SupportedCSI-RS-Resource,
            modes                           ENUMERATED {mode1, mode2, both},
            nrofPanels                      ENUMERATED {n2, n4},
            maxNumberCSI-RS-PerResourceSet  INTEGER (1..8)
        }                                                                       OPTIONAL
    },
},
```

FIG.8

```
           CodebookParameters information element (cont.)

type2                           SEQUENCE {
     supportedCSI-RS-ResourceList    SEQUENCE (SIZE (1.. maxNrofCSI-RS-Resources))
  OF SupportedCSI-RS-Resource,
     parameterLx                     INTEGER (2..4),
     amplitudeScalingType            ENUMERATED {wideband, widebandAndSubband},
     amplitudeSubsetRestriction      ENUMERATED {supported}                    OPTIONAL
  }                                                                                   OPTIONAL,
  type2-PortSelection             SEQUENCE {
     supportedCSI-RS-ResourceList    SEQUENCE (SIZE (1.. maxNrofCSI-RS-Resources))
  OF SupportedCSI-RS-Resource,
     parameterLx                     INTEGER (2..4),
     amplitudeScalingType            ENUMERATED {wideband, widebandAndSubband}
  }                                                                                   OPTIONAL,
  }

SupportedCSI-RS-Resource ::=   SEQUENCE {
     maxNumberTxPortsPerResource     ENUMERATED {p2, p4, p8, p12, p16, p24, p32},
     maxNumberResourcesPerBand       INTEGER (1..64),
     totalNumberTxPortsPerBand       INTEGER (2..256)
  }

-- TAG-CODEBOOKPARAMETERS-STOP
  -- ASN1STOP
```

FIG.9

```
-- UE-CapabilityRequestFilterNR information element
-- ASN1START
-- TAG-UE-CAPABILITYREQUESTFILTERNR-START UE-CapabilityRequestFilterNR ::=            SEQUENCE {
    frequencyBandListFilter         FreqBandList             OPTIONAL,  -- Need N
    nonCriticalExtension            UE-CapabilityRequestFilterNR-v1540       OPTIONAL
}

UE-CapabilityRequestFilterNR-v1540 ::=      SEQUENCE {
    srs-SwitchingTimeRequest        ENUMERATED {true}
        OPTIONAL,   -- Need N
    nonCriticalExtension    UE-CapabilityRequestFilterNR-v16xy    OPTIONAL
}

UE-CapabilityRequestFilterNR-v16xy ::=      SEQUENCE {
    codebookParameterFilterList         CodebookParameterFilterList
        OPTIONAL,   -- Need N
    nonCriticalExtension            SEQUENCE {}
        OPTIONAL
}
```

FIG.10

```
                    UE-CapabilityRequestFilterNR information element (cont.)

CodebookParameterFilterList ::=
    SEQUENCE (SIZE (1..maxBandsMRDC)) OF CodebookParameterFilter CodebookParameterFilter ::=                    SEQUENCE {
    bandNR                          FreqBandIndicationNR,
    totalNumberTxPortsPerBand       INTEGER (2..256)                    OPTIONAL,    -- Need N
    maxNumberTxPortsPerResource     ENUMERATED {p2, p4, p8, p12, p16, p24, p32}
                              OPTIONAL,    -- Need N
    maxNumberResourcesPerBand       INTEGER (1..64)                     OPTIONAL,    -- Need N
    maxNumberCSI-RS-ResourceList    INTEGER (1..maxNrofCSI-RS-Resources)
                              OPTIONAL,    -- Need N
    requestedCodebookTypes
        SEQUENCE {
            type1-SinglePanel       ENUMERATED {true}                   OPTIONAL,    -- Need N
            type1-MultiPanel        ENUMERATED {true}                   OPTIONAL,    -- Need N
            type2                   ENUMERATED {true}                   OPTIONAL,    -- Need N
            type2-PortSelection     ENUMERATED {true}                   OPTIONAL,    -- Need N
        }                                                       OPTIONAL    -- Need N
}

-- TAG-UE-CAPABILITYREQUESTFILTERNR-STOP
-- ASN1STOP
```

TERMINAL, BASE STATION AND COMMUNICATION METHOD

TECHNICAL FIELD

The present invention relates to a terminal, a base station and a communication method in a radio communication system.

BACKGROUND ART

In NR (New Radio) (also referred to as "5G") as a successor system of LTE (Long Term Evolution), techniques for satisfying a high capacity system, a fast data transmission speed, a low latency, simultaneous connection of a large number of terminals, a low cost, power saving or the like as requirements have been discussed (for example, non-patent document 1).

In an LTE system or an NR system, a network provides a query to a UE (User Equipment) to acquire information associated with UE's radio access capability (for example, non-patent document 2). For example, the UE's radio access capability may include a supported maximum data rate, a total buffer size for layer 2, a supported band combination, a parameter associated with a PDCP (Packet Data Convergence Protocol) layer, a parameter associated with an RLC (Radio Link Control) layer, a parameter associated with a MAC (Medium Access Control) layer, a parameter associated with a physical layer and so on (for example, non-patent document 3).

RELATED ART DOCUMENT

Non-Patent Document
[Non-Patent Document 1] 3GPP TS 38.300 V15.5.0 (2019-03)
[Non-Patent Document 2] 3GPP TS 38.331 V15.5.1 (2019-04)
[Non-Patent Document 3] 3GPP TS 38.101-3 V15.5.0 (2019-03)

SUMMARY OF INVENTION

PROBLEM TO BE SOLVED BY THE INVENTION

In a conventional technique, when the network acquires the information associated with the radio access capability for a terminal, the information associated with the radio access capability for the terminal that is not required depending on operations of the network may be reported in some cases.

In light of the above aspect, the present invention aims to allow the network to acquire a report associated with the terminal capability in a radio communication system efficiently.

Means for Solving the Problem

According to a technique disclosed herein, there is provided a terminal, including: a reception unit that receives, from a base station, a message for requesting a report of a terminal capability; a control unit that configures information for reporting a parameter associated with a codebook based on information for indicating a range of the parameter associated with the codebook included in the message for requesting the report of the terminal capability, and that includes, in a message for reporting the terminal capability, the information for reporting the parameter associated with the codebook; and a transmission unit that transmits the message for reporting the terminal capability to the base station.

ADVANTAGE OF THE INVENTION

According to the disclosed technique, the network can acquire the report associated with the terminal capability in the radio communication system efficiently.

BRIEF DESCRIPTION OF DRAWINGS

FIG. 5 is a diagram illustrating a specification change example (1) for the terminal capability report according to an embodiment of the present invention;

FIG. 6 is a diagram illustrating a specification change example (2) for the terminal capability report according to an embodiment of the present invention;

FIG. 7 is a diagram illustrating a specification change example (3) for the terminal capability report according to an embodiment of the present invention;

FIG. 8 is a diagram illustrating a specification change example (4) for the terminal capability report according to an embodiment of the present invention;

FIG. 9 is a diagram illustrating a specification change example (5) for the terminal capability report according to an embodiment of the present invention;

FIG. 10 is a diagram illustrating a specification change example (6) for the terminal capability report according to an embodiment of the present invention;

EMBODIMENTS OF THE INVENTION

Hereinafter, embodiments of the present invention will be described with reference to the drawings. The embodiments described below are merely examples, and embodiments to which the present invention is applied are not limited to the following embodiments.

In operations of a radio communication system of an embodiment of the present invention, existing techniques are used as needed. Note that the existing techniques are existing LTE, for example, but are not limited to the existing LTE. Also, unless specifically stated otherwise, it should be appreciated that the terminology "LTE" used herein has a broader meaning including LTE-Advanced and its subsequent schemes (e.g., NR).

Also, in embodiments of the present invention as described below, terminologies "SS (Synchronization Signal)", "PSS (Primary SS)", "SSS (Secondary SS)", "PBCH (Physical Broadcast Channel)", "PRACH (Physical Random Access Channel)", "PDCCH (Physical Downlink Control Channel)", "PUCCH (Physical Uplink Control Channel), "PDSCH (Physical Downlink Shared Channel)", "PUCCH (Physical Uplink Control Channel), "PUSCH (Physical Uplink Shared Channel) or the like used in the existing LTE are used. This is due to convenience of recitations, and a signal, a function or the like similar to them may be referred to as other wordings. Also, the above terminologies correspond to "NR-SS", "NR-PSS", "NR-SSS", "NR-PBCH", "NR-PRACH", "NR-PDCCH", "NR-PDSCH", "NR-PUCCH" and "NR-PUSCH", respectively, in the NR. Note that even if the signals are used in the NR, they may not be explicitly described as "NR-".

Also, in embodiments of the present invention, a duplex scheme may be TDD (Time Division Duplex) scheme, FDD (Frequency Division Duplex) scheme or other schemes (e.g., flexible duplex scheme or the like).

Also, in embodiments of the present invention, "configuring" a radio parameter or the like may mean that a predetermined value is pre-configured or that a radio parameter indicated from a base station 10 or a terminal 20 is configured.

Figure 1:
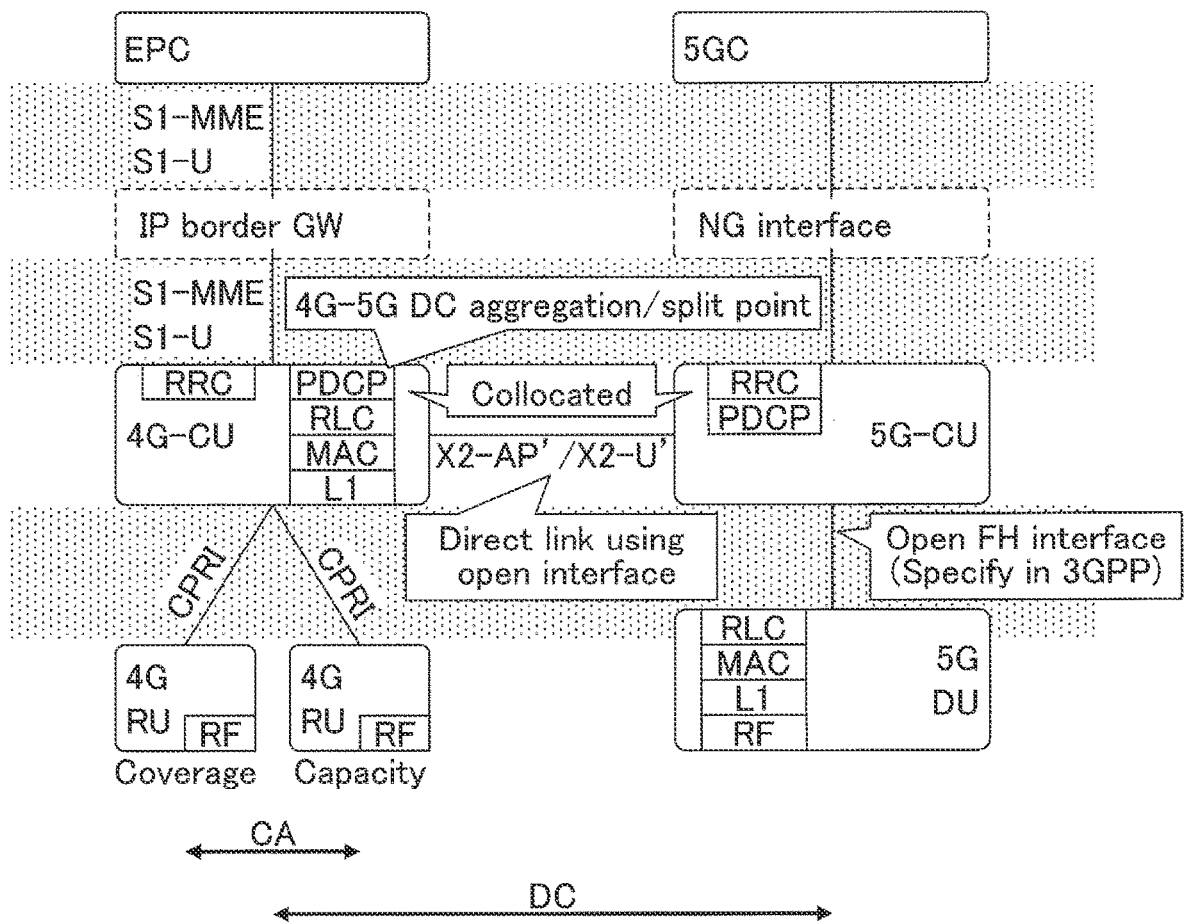
FIG. 1 is a diagram illustrating an example of arrangement of a network architecture according to an embodiment of the present invention.

FIG. 1 is a diagram illustrating an example of arrangement of a network architecture. As illustrated in FIG. 1, a radio network architecture according to an embodiment of the present invention includes a 4G-CU, a 4G-RU (Remote Unit, a remote radio station), an EPC (Evolved Packet Core) and so on in the LTE-Advanced. The radio network architecture according to the embodiment of the present invention includes a 5G-CU, a 5G-DU and so on in the 5G.

As illustrated in FIG. 1, the 4G-CU includes layers up to an RRC (Radio Resource Control), a PDCP (Packet Data Convergence Protocol), an RLC (Radio Link Control), a MAC (Medium Access Control) and an L1 (Layer 1, PHY layer or Physical layer) and is connected to the 4G-RU via a CPRI (Common Public Radio Interface). A network node including the 4G-CU and the 4G-RU is referred to as an eNB.

On the other hand, in the 5G, as illustrated in FIG. 1, the 5G-CU includes an RRC layer and is connected to a 5G-DU via a FH (Fronthaul) interface and to a 5GC (5G Core Network) via an NG interface. Also, the 5G-CU is connected to the 4G-CU via an X2 interface. The PDCP layer in the 4G-CU becomes a coupling or decoupling point for 4G-5G DC (Dual Connectivity), that is, EN-DC (E-UTRA-NR Dual Connectivity). A network node including the 5G-CU and the 5G-DU is referred to as a gNB. Also, the 5G-CU and the 5G-DU may be referred to as a gNB-CU and a gNB-DU, respectively.

Also, as illustrated in FIG. 1, CA (Carrier Aggregation) is performed among 4G-RUs, and DC is performed between the 4G-RU and the 5G-DU. Although not illustrated in the figure, a UE (User Equipment) is wirelessly connected to the 4G-RU or the 5G-DU via their RFs to transmit and receive packets.

Note that FIG. 1 corresponds to the radio network architecture for the LTE-NR DC, that is, for the EN-DC (E-UTRA-NR Dual Connectivity). However, if the 4G-CU is divided into CU-DU or is operated as NR standalone, the same radio network architecture may be used. If the 4G-CU is divided into the CU-DU, functionalities associated with the RRC layer and the PDCP layer may be moved to the 4G-CU, and functionalities associated with the RLC layer and its lower layers may be included in the 4G-DU. Note that the data rate of the CPRI may be decreased due to the CU-DU division.

Note that multiple 5G-DUs may be connected to the 5G-CU. Also, NR-DC (NR-NR Dual Connectivity) may be performed by coupling a UE to the multiple 5G-DUs, or the NR-DC may be performed by coupling the UE to the multiple 5G-DUs and the single 5G-CU. Note that the 5G-CU may be connected to the RPC directly without via the 4G-CU, or the 4G-CU may be connected to the 5GC directly without via the 5G-CU.

Figure 2:
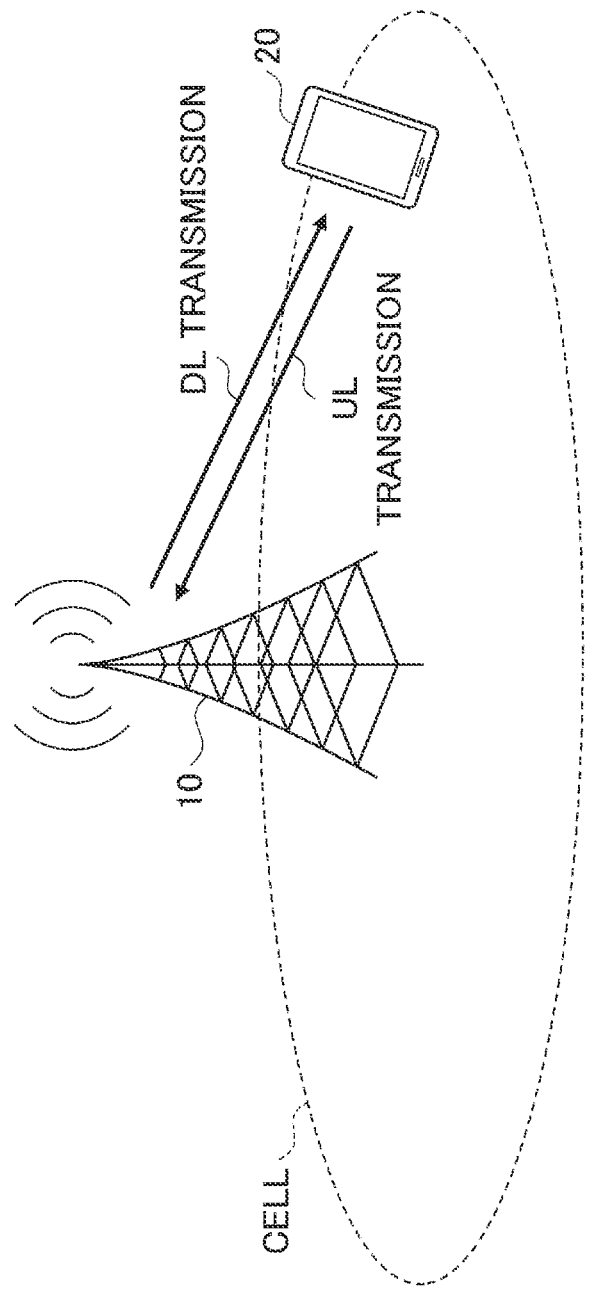
FIG. 2 is a diagram illustrating an example of arrangement of a radio communication system according to an embodiment of the present invention.

FIG. 2 is a diagram illustrating an example of arrangement of a radio communication system according to an embodiment of the present invention. As illustrated in FIG. 2, the radio communication system according to the embodiment of the present invention includes the base station 10 and the terminal 20. In FIG. 2, the single base station 10 and the single terminal 20 are illustrated, but the illustrated embodiment is merely one example, and a plurality of the base stations 10 and a plurality of the terminals 20 may be provided.

The base station 10 is a communication device that serves one or more cells and wirelessly communicates to the terminal 20. A physical resource for a radio signal is defined with a time domain and a frequency domain. The time domain may be defined with the number of OFDM symbols, and the frequency domain may be defined with the number of subcarriers or the number of resource blocks. The base station transmits a synchronization signal and system information to the terminal 20. The synchronization signal may be an NR-PSS and an NR-SSS, for example. The system information may be transmitted in an NR-PBCH, for example, and may be also referred to as broadcast information. As illustrated in FIG. 2, the base station 10 transmits a control signal or data to the terminal 20 in downlinks (DLs) and receives a control signal or data from the terminal 20 in uplinks (ULs). Any of the base station 10 and the terminal 20 can perform beamforming to transmit and receive signals. Also, any of the base station 10 and the terminal 20 can perform beamforming for transmission and reception of signals. Also, any of the base station 10 and the terminal 20 can apply MIMO (Multiple Input Multiple Output) communication to the DLs and ULs. Also, any of the base station 10 and the terminal 20 may communicate via a SCell (Secondary Cell) and a PCell (Primary Cell) in CA (Carrier Aggregation).

The terminal 20 is a communication device having a radio communication function such as a smartphone, a portable telephone, a tablet, a wearable terminal, a M2M (Machine-to-Machine) communication module or the like. As illustrated in FIG. 2, the terminal 20 receives a control signal or data from the base station 10 in DLs and transmits a control signal or data to the base station 10 in ULs to use various communication services provided by the radio communication system.

Figure 3:
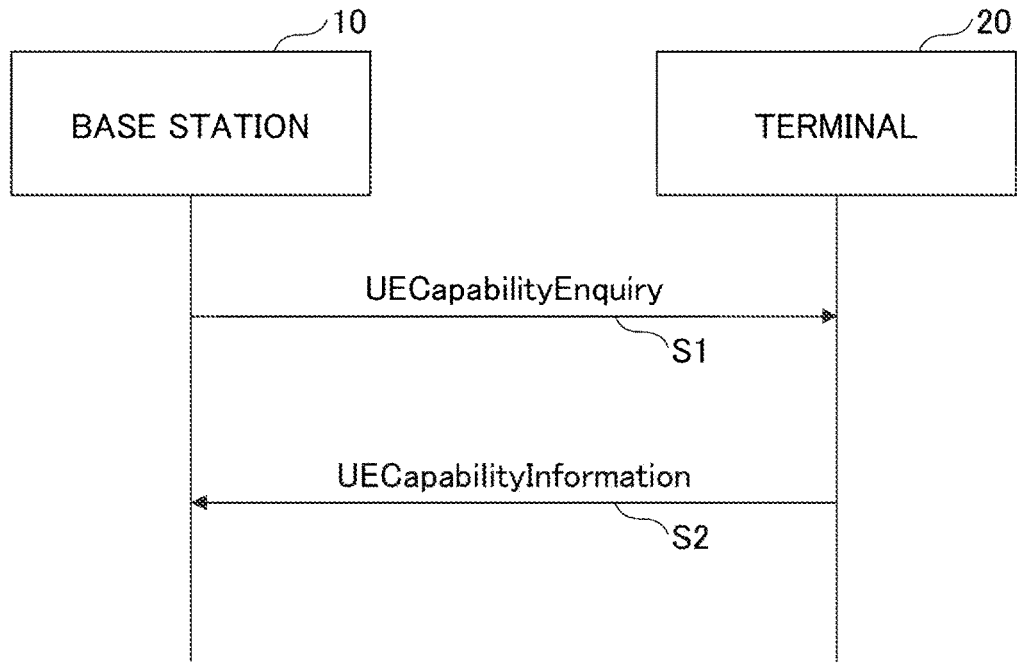
FIG. 3 is a sequence diagram illustrating an example of a terminal capability report according to an embodiment of the present invention.

FIG. 3 is a sequence diagram illustrating an example of a terminal capability report according to an embodiment of the present invention. At step S1 illustrated in FIG. 3, the base station 10 transmits a "UECapabilityEnquiry", that is, an enquiry for a UE capability, to the terminal 20. At the subsequent step S2, the terminal 20 transmits "UECapabilityInformation" for the UE capability indicated by the received "UECapabilityEnquiry", that is, a report of the UE capability, to the base station 10. The "UECapabilityInformation" includes the UE capability supported by the terminal 20. The base station 10 identifies the supported UE capability based on the received "UECapabilityInformation" and applies what is identified to radio communication with the terminal 20.

For example, in the "UECapabilityInformation", an information element "CodebookParameters" for reporting, for each band, parameters associated with the UE capability, related to MIMO (Multiple Input and Multiple Output), is defined. With the "CodebookParameters", the UE capability is reported to a network, for each of MIMO operation schemes 1) to 4) as shown below.

1) Type 1: single-panel
2) Type 1: multi-panel
3) Type 2
4) Type 2 port selection For example, for each of Types 1) to 4), a reporting scheme for a codebook, a precoder and a PMI (Precoding Matrix Indicator) and so on is defined.

Moreover, an information element "SupportedCSI-RS-Resource" configured for each of the above 1) to 4) is a parameter for indicating a resource for a CSI-RS (Channel State Information Reference Signal), supported by the terminal 20 and is composed of elements a) to c) as follows.

a) The maximum number of transmission ports per the CSI-RS resource (maxNumberTxPortsPerResource)
b) The maximum number of CSI-RS resources per band (maxNumberResourcePerBand)
c) The total number of transmission ports per band (totalNumberTxPortsPerBand)

For example, the maximum number of transmission ports per CSI-RS resource can be configured to any of {2, 4, 8, 12, 16, 24, 32}. For example, the maximum number of CSI-RS resources per band can be configured to any number of 1 to 64. For example, the total number of transmission ports per band can be configured to any number of 2 to 256.

Here, "CodebookParameters" allows the maximum number of sixteen "SupportedCSI-RS-Resource" to be reported for each of the above MIMO operation schemes 1) to 4). Accordingly, the signaling size of the "UECapabilityInformation" will be large. On the other hand, unnecessary combinations may exist depending on operational parameters for the network associated with the MIMO, and in some cases, the UE capability unused in the network may be reported in conventional techniques. For example, the total number of transmission ports per band indicated in the "SupportedCSI-RS-Resource" indicates the total number of transmission antennas per one frequency band at the base station 10 that can be received by the terminal 20. However, the number of transmission antennas at the base station 10 are nearly fixed in the operation, and even if the terminal 20 reports a larger number of transmission ports than the number of operated transmission antennas, the reported number of transmission antennas is not used by the network.

Accordingly, the information element "UE-CapabilityRequestFilterNR", included in the "UECapabilityEnquiry" for use in the case where the network requests the UE to report the filtered UE capability, may be used to prevent the terminal 20 from reporting the UE capability, which is not necessary for a network, to the base station 10.

For example, a new information element "CodebookParameterFilter" is added to the "UE-CapabilityRequestFilterNR", and, with the new information element, the terminal 20 indicates an upper limit value to be reported by using the "CodebookParameters". The "CodebookParameterFilter" may be information for indicating ranges of respective parameters to be reported by the terminal by using the "CodebookParameters".

For example, when indicating the upper limit value of the total number of transmission ports for each of the bands specified by the "SupportedCSI-RS-Resource", the "UECapabilityEnquiry" is transmitted to the terminal 20 by configuring the upper limit value to the "CodebookParameterFilter" depending on the number of transmission antennas used in the network, and thus, the terminal 20 can avoid reporting a larger number of transmission ports than the number of operated transmission antennas.

Figure 4:
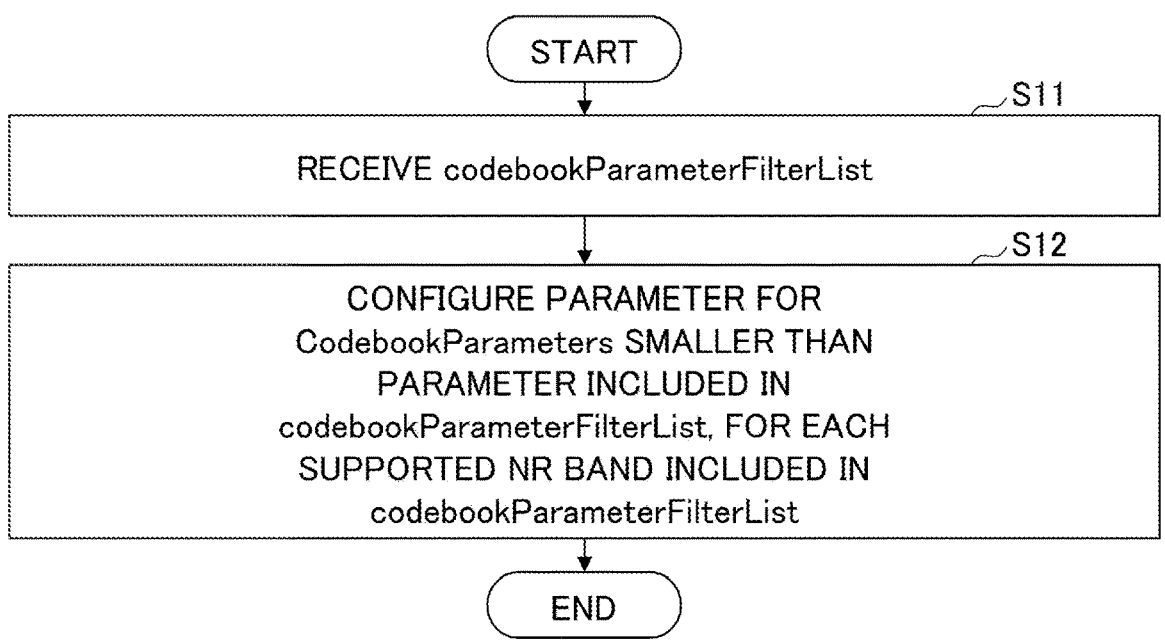
FIG. 4 is a flowchart illustrating an example of a terminal capability report according to an embodiment of the present invention.

FIG. 4 is a flowchart illustrating an example of a terminal capability report according to an embodiment of the present invention. An operation example to prevent the terminal 20 from reporting the UE capability, which is not necessary for the above-described network, to the base station 10, is described with reference to FIG. 4.

At step S11, the terminal 20 receives "CodebookParameterFilterList" included in the "UECapabilityEnquiry". The "CodebookParameterFilterList" is a list including one or more "CodebookParameterFilter"s configured for each band.

Then, at step S12, the terminal 20 configures a parameter for the "CodebookParameters" smaller than a parameter included in the "CodebookParameterFilter", for each supported NR band included in the "CodebookParameterFilter". Note that a parameter equal to the corresponding parameter included in the "CodebookParameterFilter" may be configured to the "CodebookParameters".

For example, if a "totalNumberTxPortsPerBand" is "128" in the "CodebookParameterFilter", the terminal 20 may configure any value from 2 to 128 to the "totalNumberTxPortsPerBand" in the "CodebookParameters" and perform reporting to the network.

Also, for example, if a "maxNumberTxPortsPerResource" is "16" in the "CodebookParameterFilter", the terminal 20 may configure any value of {2, 4, 8, 16} to the "maxNumberTxPortsPerResource" in the "CodebookParameters" and perform reporting to the network.

Also, for example, if a "maxNumberResourcesPerBand" is "32" in the "CodebookParameterFilter", the terminal 20 may configure any value from 1 to 32 to the "maxNumberResourcesPerBand" in the "CodebookParameters" and perform reporting to the network.

Also, for example, if a "maxNumberCSI-RS-ResourceList" is "3" in the "CodebookParameterFilter", the terminal 20 may configure at most three "SupportedCSI-RS-Resource"s to the "maxNumberCSI-RS-ResourceList" in the "CodebookParameters" and perform reporting to the network. In other words, the "maxNumberCSI-RS-ResourceList" indicates the upper limit value for the number of entries of the "SupportedCSI-RS-Resources".

Note that the "UECapabilityEnquiry" may include information for indicating which type of reporting is requested: Type 1 single-panel, Type 1 multi-panel, Type 2, or Type 2 port selection, which indicates a type of "CodebookParameters". This information may be indicated by an information element "requestedCodebookTypes", for example.

The base station 10 receives the "UECapabilityInformation" including the "CodebookParameters" configured at step S12 from the terminal 20. The base station 10 configures MIMO related communication with the terminal 20 based on the UE capability according to the "CodebookParameters".

FIG. 5 is a diagram illustrating a specification change example (1) for a terminal capability report according to an embodiment of the present invention. As illustrated in FIG. 5, a parameter or an entry that does not exceed the upper limit value included in the "CodebookParamterFilter" is configured to "CodebookParameters". Also, if a type is indicated by a "requestedCodebookTypes", the terminal 20 may configure the indicated type of "CodebookParameters" to the "UECapabilityInformation" and perform reporting to the base station 10.

FIG. 6 is a diagram illustrating a specification change example (2) for a terminal capability report according to an embodiment of the present invention. The "codebookParametersRequested", included in an information element "RFParametersMRDC" illustrated in FIG. 6, is configured to "true" in a case where the "CodebookParameters" is reported by the terminal 20.

FIG. 7 is a diagram illustrating a specification change example (3) for a terminal capability report according to an embodiment of the present invention, and FIG. 8 is a diagram illustrating a specification change example (4) for a terminal capability report according to an embodiment of the present invention. As illustrated in FIGS. 7 and 8, a "supportedCSI-RS-ResourceList" is configured to the information element "CodebookParameters" for each of Type1 single-panel, Type1 multi-panel, Type2, and Type2 port selection. The "supportedCSI-RS-Resource", included in the "supportedCSI-RS-ResourceList", includes a "maxNumberTxPortsPerResource", a "maxNumberResourcesPerBand" and a "totalNumberTxPortsPerBand".

FIG. 9 is a diagram illustrating a specification change example (5) for a terminal capability report according to an embodiment of the present invention, and FIG. 10 is a diagram illustrating s specification change example (6) for a terminal capability report according to an embodiment of the present invention. As illustrated in FIGS. 9 and 10, an information element "UE-CapabilityRequestFilterNR" includes the "CodebookParameterFilterList". As described above, the "CodebookParameterFilterList" indicates the upper limit value for a parameter or an entry to be configured to the "CodebookParameters". The "CodebookParameterFilter", included in "CodebookParameterFilterList", includes a "maxNumberTxPortsPerResource", a "maxNumberResourcesPerBand", a "totalNumberTxPortsPerBand", a "maxNumberCSI-RS-ResourceList" and a "requestedCodebookTypes".

According to the above-described embodiments, the terminal 20 can report the necessary UE capability associated with the MIMO, depending on operations of a network, to the network, and thus, the signaling size associated with the report of the UE capability can be decreased.

In other words, the network can efficiently acquire the report associated with the terminal capability in a radio communication system.

(Device Arrangement)

Next, exemplary functional arrangements of the base station 10 and the terminal 20 that perform operations and actions as stated above are described. The base station 10 and the terminal 20 include functions of implementing the above-stated embodiments. Note that the base station 10 and the terminal 20 each may have only a portion of the functions of the embodiments.

<Base Station 10>

Figure 11:
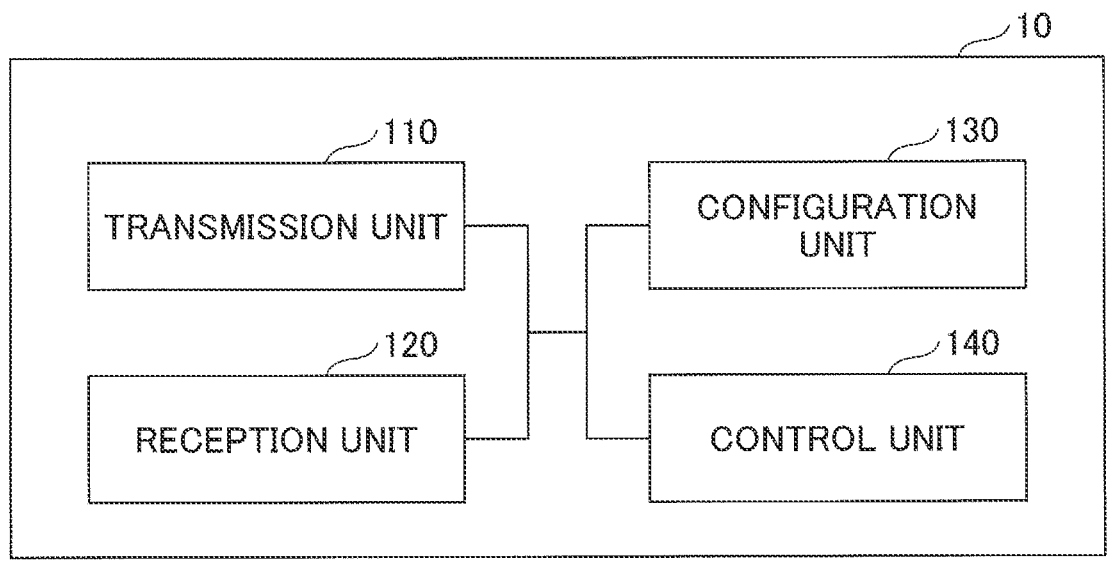
FIG. 11 is a diagram illustrating an example of functional arrangement of a base station according to an embodiment of the present invention.

FIG. 11 illustrates an example of functional arrangement of the base station 10. As shown in FIG. 11, the base station 10 includes a transmission unit 110, a reception unit 120, a configuration unit 130 and a control unit 140. The functional arrangement shown in FIG. 11 is only one example. The functional separation and the names of the functional units may be arbitrary as long as operations according to the present embodiment can be achieved.

The transmission unit 110 includes a function of generating a signal for transmission to the side of the terminal 20 and wirelessly transmitting the signal. Also, the transmission unit 110 transmits inter-network-node messages to other network nodes. The reception unit 120 includes a function of receiving various signals transmitted from the terminal 20 and acquiring information for upper layers from the received signals, for example. Also, the transmission unit 110 includes a function of transmitting an NR-PSS, an NR-SSS, an NR-PBCH, a DL/UL control signal or the like to the terminal 20. Also, the reception unit 120 receives inter-network-node messages from other network nodes.

The configuration unit 130 stores preconfigured configurations and various configurations for transmission to the terminal 20. Contents of the configurations may be information associated with transmission and reception configurations corresponding to the UE capability of the terminal 20 or the like, for example.

The control unit 140 performs control associated with processing associated with reporting the UE capability for a radio parameter received from the terminal 20 as stated in conjunction with the embodiments. Also, the control unit 140 controls communication with the terminal 20 based on the UE capability report regarding the radio parameter received from the terminal 20. The functional portions of the control unit 140 related to signal transmission may be included in the transmission unit 110, and the functional portions of the control unit 140 related to signal reception may be included in the reception unit 120.

<Terminal 20>

Figure 12:
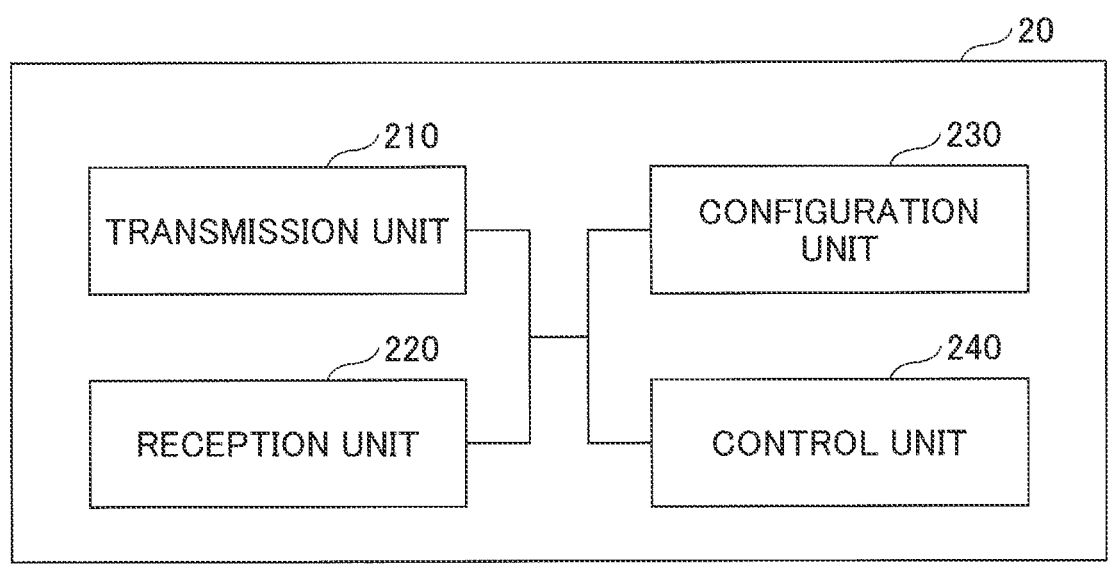
FIG. 12 is a diagram illustrating an example of functional arrangement of a terminal 20 according to an embodiment of the present invention.

FIG. 12 is a diagram illustrating an example functional arrangement of the terminal 20 according to an embodiment of the present invention. As illustrated in FIG. 12, the terminal 20 has a transmission unit 210, a reception unit 220, a configuration unit 230 and a control unit 240. The functional arrangement shown in FIG. 12 is only one example. The functional separation and the names of the functional units may be arbitrary as long as operations according to the present embodiment can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal and so on transmitted from the base station 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other terminals 20, and the reception unit 120 receives the PSCCH, the PSSCH, the PSDCH, the PSBCH or the like from other terminals 20.

The configuration unit 230 stores various configurations received at the reception unit 220 from the base station 10. Also, the configuration unit 230 stores preconfigured configurations. Contents of the configurations may be information associated with transmission and reception configurations corresponding to the UE capability and so on, for example.

The control unit 240 performs control associated with reporting the UE capability regarding a radio parameter for the terminal 20 as stated above. The functional portion of the control unit 240 regarding signal transmission may be included in the transmission unit 210, and the functional portion of the control unit 240 regarding signal reception may be included in the reception unit 220.

(Hardware Arrangement)

The block diagrams (FIGS. 11 and 12) used for the description of the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 13:
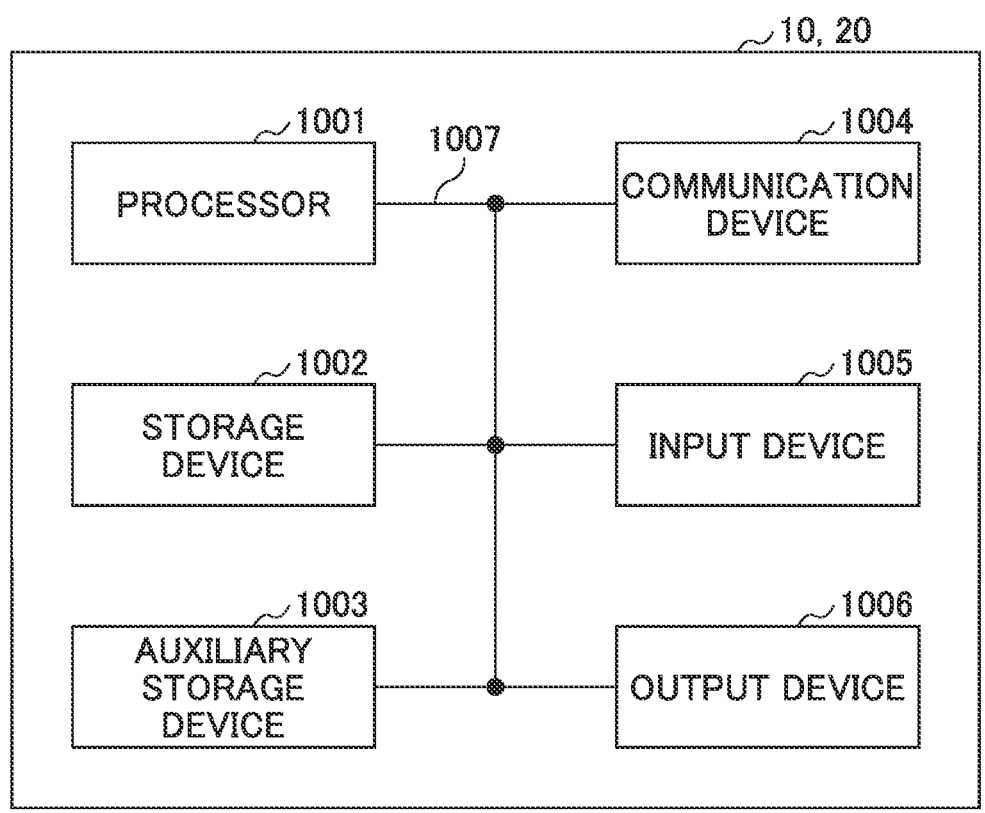
FIG. 13 is a diagram illustrating an example of hardware arrangement of the base station or the terminal 20 according to an embodiment of the present invention.

For example, each of the base station 10, the terminal 20 and so on according to one embodiment of the present invention may function as a computer performing operations for a radio communication method according to this embodiment. FIG. 13 is a diagram illustrating an example of a hardware configuration of the base station 10 and the terminal 20 according to one embodiment of the present disclosure. The base station 10 and the terminal 20 as stated above may be physically configured as a computer device including a processor 1001, a storage device 1002, a auxiliary storage device 1003, a communication device 1004, an input device 1005, an output device 1006, a bus 1007, etc.

In the following description, the term "device" can be read as a circuit, a device, a unit, etc. The hardware configuration of the base station and the terminal 20 may be configured to include one or more of the respective devices shown in the figure, or may be configured without some devices.

Each function of the base station 10 and the terminal 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally, the processor 1001 reads a program (program code), a software module, data, etc., from at least one of the auxiliary storage device 1003 and the communication device 1004 to the storage device 1002, and executes various processes according to these. As the program, a program is used which causes a computer to execute at least a part of the operations described in the above-described embodiment. For example, the control unit 140 of the base station 10 shown in FIG. 11 may be implemented by a control program that is stored in the storage device 1002 and that is operated by the processor 1001. Also, for example, the control unit 240 of the terminal 20 shown in FIG. 12 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory (main storage device), etc. The storage device 1002 may store a program (program code), a software module, etc., which can be executed for implementing the radio communication method according to one embodiment of the present disclosure.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The auxiliary storage device 1003 may be referred to as an auxiliary storage device. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and storage device 1002, is also connected by the bus 1007 for communicating information. The bus 1007 may be formed of a single bus or may be formed of different buses between devices.

Also, the base station 10 and the terminal may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

Conclusion of the Embodiments

As stated above, according to an embodiment of the present invention, there is provided a terminal, including: a reception unit that receives, from a base station, a message for requesting a report of a terminal capability; a control unit that configures information for reporting a parameter associated with a codebook based on information for indicating a range of the parameter associated with the codebook included in the message for requesting the report of the terminal capability, and that includes, in a message for reporting the terminal capability, the information for reporting the parameter associated with the codebook; and a transmission unit that transmits the message for reporting the terminal capability to the base station.

According to the above arrangement, the terminal 20 can report the necessary UE capability associated with the MIMO, depending on operations of a network, to the network. In other words, the network can efficiently acquire a report associated with the terminal capability in a radio communication system.

The information for requesting the report of the terminal capability may include information for indicating a codebook type, and the control unit may determine a codebook type to be configured to the information for reporting the parameter associated with the codebook, based on the information for indicating the codebook type. According to the arrangement, the terminal 20 can report the parameter associated with the codebook type required by the network.

The information for indicating the range of the parameter associated with the codebook may include at least one of: an upper limit value of a number of entries composing an information list for configuring supported reference signal resources for acquiring a channel state; an upper limit value of a maximum number of transmission ports for each reference signal resource for acquiring the channel state; an upper limit value of a maximum number of the reference signal resources for acquiring the channel state, for each band; and an upper limit value of a total number of transmission ports, for each band. According to the arrangement, the terminal 20 can report a supported parameter for codebook without exceeding the upper limit value of the parameter associated with the codebook, supported by the network.

The control unit may configure the information for reporting the parameter associated with the codebook such that an upper limit value included in the information for indicating the range of the parameter associated with the codebook is not exceeded. According to the arrangement, the terminal can report a supported parameter for codebook without exceeding the upper limit value of the parameter associated with the codebook, supported by the network.

Also, according to an embodiment of the present invention, there is provided a base station, comprising: a transmission unit that transmits, to a terminal, a message for requesting a report of a terminal capability; a reception unit that receives a message for reporting the terminal capability from the terminal, wherein the message includes information for reporting a parameter associated with a codebook, the information for reporting the parameter associated with the codebook being configured based on information for indicating a range of the parameter associated with the codebook, the information for indicating the range of the parameter associated with the codebook being included in the massage for requesting the report of the terminal capability; and a control unit that controls communication with the terminal, based on the message for reporting the terminal capability.

According to the above arrangement, the terminal 20 can report the UE capability associated with the MIMO required corresponding to operations for a network to the network. In other words, the network can acquire a report associated with the terminal capability in a radio communication system efficiently.

Also, according to an embodiment of the present invention, there is provided a communication method, comprising: a reception procedure that receives, from a base station, a message for requesting a report of a terminal capability; a control procedure that configures information for reporting a parameter associated with a codebook, based on information for indicating a range of the parameter associated with the codebook included in the message for requesting the report of the terminal capability, and that includes, in a message for reporting the terminal capability, the information for reporting the parameter associated with the codebook; and a transmission procedure that transmits the message for reporting the terminal capability to the base station.

According to the above arrangement, the terminal 20 can report the UE capability associated with the MIMO required corresponding to operations for a network to the network. In other words, the network can acquire a report associated with the terminal capability in a radio communication system efficiently.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments (that may be called D2D (Device-to-Device), V2X (Vehicle-to-Everything), or the like). In this case, a user equipment 20 may have above-described functions of the base station apparatus 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource assignment unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of configured BWPs may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the "UECapabilityEnquiry" is one example of the message for requesting to report the terminal capability. The "UECapabilityInformation" is one example of the message for reporting the terminal capability. The "CodebookParameterFilter" is one example of the information for indicating a range of a parameter associated with a codebook. The "CodebookParameters" is one example of the information for reporting a parameter associated with a codebook. The CSI-RS is one example of the reference signal for acquiring a channel state. The "maxNumberTxPortsPerResource" is one example of the maximum number of transmission ports per resource for a reference signal for acquiring a channel state. The "maxNumberResourcesPer- Band" is one example of the maximum number of CSI-RS resources per band. The "totalNumberTxPortsPerBand" is one example of the total number of transmission ports per band. The "supportedCSI-RS-Resourcelist" is one example of the list of information for configuring a resource for a reference signal for acquiring a supported channel state. The "supportedCSI-RS-Resource" is one example of the information for configuring a resource for a reference signal for acquiring a supported channel state. The "requestedCodebookTypes" is one example of the information for indicating a codebook type.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal, comprising:
a receiver that receives, from a base station, a message for requesting a report of a terminal capability;
a processor that includes, in a message for reporting the terminal capability, information for reporting a parameter associated with a codebook, based on information for indicating a type of the codebook included in the message for requesting the report of the terminal capability; and
a transmitter that transmits the message for reporting the terminal capability to the base station,
wherein types of the codebook include a Type-1 single-panel, a Type-1 multi-panel, a Type-2, and a Type-2 port selection,
wherein the terminal capability is filtered based on band information included in the message for requesting the report, and
wherein the information for reporting the parameter relates to Multiple Input and Multiple Output (MIMO), and the parameter indicates supported Channel State Information Reference Signal (CSI-RS) resources to be reported for each of the types of the codebook.

2. The terminal as claimed in claim 1, wherein the processor configures, to the parameter associated with the codebook, a reference signal resource for acquiring a channel state, the reference signal resource corresponding to the type of the codebook.

3. A base station, comprising:
a transmitter that transmits, to a terminal, a message for requesting a report of a terminal capability;
a receiver that receives, from the terminal, a message for reporting the terminal capability, the message including information for reporting a parameter associated with a codebook, the information for reporting the parameter associated with the codebook being configured based on information for indicating a type of the codebook, the information for indicating the type of the codebook being included in the message for requesting the report of the terminal capability; and
a processor that controls communication with the terminal, based on the message for reporting the terminal capability,
wherein types of the codebook include a Type-1 single-panel, a Type-1 multi-panel, a Type-2, and a Type-2 port selection,
wherein the terminal capability is filtered based on band information included in the message for requesting the report, and
wherein the information for reporting the parameter relates to Multiple Input and Multiple Output (MIMO), and the parameter indicates supported Channel State Information Reference Signal (CSI-RS) resources to be reported for each of the types of the codebook.

4. A communication method, comprising:
a reception procedure that receives, from a base station, a message for requesting a report of a terminal capability;
a control procedure that includes, in a message for reporting the terminal capability, information for reporting a parameter associated with a codebook, based on information for indicating a type of the codebook included in the message for requesting the report of the terminal capability; and
a transmission procedure that transmits the message for reporting the terminal capability to the base station,
wherein types of the codebook include a Type-1 single-panel, a Type-1 multi-panel, a Type-2, and a Type-2 port selection,
wherein the terminal capability is filtered based on band information included in the message for requesting the report, and
wherein the information for reporting the parameter relates to Multiple Input and Multiple Output (MIMO), and the parameter indicates supported Channel State Information Reference Signal (CSI-RS) resources to be reported for each of the types of the codebook.

* * * * *